United States Patent [19]

Losoi

[11] Patent Number: 5,165,995
[45] Date of Patent: Nov. 24, 1992

[54] PROCESS FOR COATING TITANIUM DIOXIDE PIGMENTS

[75] Inventor: Tuomo Losoi, Pori, Finland

[73] Assignee: Kemira Oy, Helsinki, Finland

[21] Appl. No.: 543,652

[22] Filed: Jun. 26, 1990

[30] Foreign Application Priority Data

Jun. 26, 1989 [FI] Finland .................. 893104

[51] Int. Cl.⁵ ............................. B32B 5/16
[52] U.S. Cl. .................... 428/403; 106/438; 106/443; 106/600
[58] Field of Search ............. 428/403; 106/438, 443, 106/300, 442, 600, 635

[56] References Cited

U.S. PATENT DOCUMENTS

| | | | |
|---|---|---|---|
| 3,141,788 | 7/1964 | Whately | 106/300 |
| 3,547,671 | 12/1970 | Hitzemann et al. | 106/443 |
| 3,702,773 | 11/1972 | Hall | 106/443 |
| 4,052,223 | 10/1977 | Howard | 106/300 |
| 4,328,040 | 5/1982 | Panek et al. | 106/300 |
| 4,447,271 | 5/1984 | Howard et al. | 106/438 |

FOREIGN PATENT DOCUMENTS

| | | | |
|---|---|---|---|
| 278150 | 10/1965 | Australia | 106/443 |
| 0008101 | 2/1980 | European Pat. Off. | |
| 1202422 | 11/1965 | Fed. Rep. of Germany. | |
| 1392413 | 10/1965 | France. | |
| 2318211 | 2/1977 | France. | |
| 2320971 | 3/1977 | France. | |

*Primary Examiner*—Edith Buffalow
*Attorney, Agent, or Firm*—Wolf, Greenfield & Sacks

[57] ABSTRACT

The object of the invention is a process for coating a titanium dioxide pigment according to which a dispersion of titanium dioxide in water is formed, optionally in the presence of a dispersing agent, such as a water soluble silicate and/or an aminoalcohol, whereafter to the titanium dioxide pigment dispersion (1) an acidic hydrolysable titanium compound in an amount of 0.1 to 1.5% by weight calculated as $TiO_2$, (2) a water soluble phosphate in an amount of 0.1 to 1.0% by weight calculated as $P_2O_5$, (3) an acidic hydrolysable zirconium salt in an amount of 0.1 to 1.4% by weight calculated as $ZrO_2$, is added, the slurry is made alkaline with a base, and (4) a water soluble hydrolysable alkaline aluminium compound is added in an amount of 0.5 to 5.5% by weight calculated as $Al_2O_3$, whereby all the percentages by weight are calculated from the weight of the $TiO_2$-pigment and the alkaline slurry formed is neutralized with an acid and the coated titanium dioxide pigment is recovered. The produced pigment has excellent gloss and weather resistance properties.

14 Claims, No Drawings

PROCESS FOR COATING TITANIUM DIOXIDE PIGMENTS

This invention concerns a process according to which titanium dioxide manufactured by the sulfate or chloride process is coated with hydrated oxides of titanium, phosphorus, zirconium and aluminium in order to improve the weather resistance of the titanium dioxide pigment. Essential with regard to the $TiO_2$ coated in accordance with the process is that its optical properties, such as gloss and whitening power, remain good compared to existing, so called super weather resistant $TiO_2$-pigments.

A major part of the commercial $TiO_2$-pigments are surface coated with inorganic agents. The reasons for this step, which from the point of view of manufacture, is elaborate, may be generalized as follows. The dispersability, colour stability and hiding power of coated pigments are clearly better than those of uncoated $TiO_2$-samples. In addition, paints and plastics containing coated $TiO_2$-pigments have a better weather resistance than the corresponding systems pigmented with uncoated $TiO_2$.

Uncoated $TiO_2$ is poorly dispersed in various binders, and for example the optical properties of paints, such as gloss and hiding power, thus remain poor. Coating the $TiO_2$ improves the said characteristics. However, the used binder system determines the coating composition. It is generally known that $TiO_2$ coated with hydrated oxides of aluminium is well suited for example for use in alkyd type paints. It is also known that $TiO_2$-samples containing a large amount of silicates as a coating are well wetted in water based paints, and the stability of the said paints is good.

Titanium dioxide as such absorbs strongly ultraviolet light. This is a good property as the photochemical degradation of the binder itself slows down in the weather test. On the other hand, titanium dioxide is a photocatalyst, initiating chemical reactions on the interfaces between the pigment and the binder resulting in the degradation of the binder. By preventing the direct contact between the titanium dioxide and the binder with coating substances, it is possible to slow down markedly the decomposition of the binder. As coating substances, hydrated oxide of aluminium as well as hydrated mixed oxides of aluminium and silicon, are used. Also some other chemicals are known, which improve the applicability of the pigment for special purposes.

Improved weather resistance is achieved with a variety of coating treatments. One known manner is the embodiment according to the U.S. Pat. No. 4,125,412 (1978) of a process according to which onto $TiO_2$-crystals is deposited at 80° to 100° C. a rich, but dense layer of $SiO_2$ and onto this still a layer of $Al_2O_3$. Also well known is the use in conjunction of hydrated oxides of aluminium, silicon and zirconium, as examples may be mentioned the Finnish patents 72737 and 72738. The use of $ZrO_2$ is considered to improve the weather resistance compared to samples which do not contain the same but which are otherwise similar. Common for the processes described above is that the amount of coating substances is large, even higher than 10% by weight of the sample. Thereby the ligthning power and gloss properties of the pigment are impaired as compared to $TiO_2$-pigments thinly coated. In other words, one has had to sacrifice the optical properties for weather resistance.

In some cases the optical properties of $TiO_2$-pigments are more important than the weather resistance, the coating being thinner. Also from this field a number of patent examples is known. The U.S. Pat. No. 3,127,280 (1964) discloses the use of titanium phosphate together with an $Al_2O_3$-coating in order to improve weather resistance. According to the U.S. Pat. No. 3,141,788 (1964) the same principle is involved between zirconium phosphate when used together with a main coating of $AL_2O_3$. Also known is the use of hydrated tin, zirconium and titanium oxides with an $Al_2O_3$-coating to improve weather resistance (JP-patent 61 281 018), as well as the weather resistance improving effect of hydrated tin and phosphorus oxides (JP-patent 58 134 158). Use of hydrated tin and zirconium oxides together with a main coating of $Al_2O_3$ is considered to improve the weather resistance of pigments (U.S. Pat. No. 4,405,376 (1983)). A disadvantage is, however, a reduction in the whiteness of the pigment due to the use of tin compounds.

In addition to the above mentioned pigments which may be classified as weather resistant, examples are known of how the deposition of the coating substances affects the weather resistance. In the Finnish patent 58506 is dislcosed that the acidic zirconium compound to be used for coating has to be deposited at least partly prior to the other coating components in order to improve weather resistance. According to the Finnish patent 66417, it is advantageous to use, as the zirconium compound, a zirconium carbonate complex having a pH-value of preferably over 8.5, in order to improve weather resistance. Also an example is known where improved weather resistance has been achieved when $TiO_2$-crystals are coated by adding to the $TiO_2$-slurry first a water soluble phosphoros compound, then a mixture of acidic zirconium and aluminium compounds, followed, if necessary, by a water soluble silicon compound and finally an alkaline aluminium compound (U.S. Pat. No. 4,052,223).

The object of the present invention is to provide a process for the production of a coated titanium dioxide pigment having both improved optical characteristics as well as weather resistance. The characteristic features of the process according to the invention are disclosed in the claim 1.

The titanium dioxide pigment to be coated may be prepared in any desired manner, but advantageously it has been obtained by the commercial sulfate or the commercial chloride process. These two processes are described in many details in Volume I of "Pigment Handbook" published by John Wiley & Sons (1988). The rutile crystal form of $TiO_2$ is preferred to the anatase one, and the rutile content of $TiO_2$ is at least 95% and preferably at least 97%.

The titanium dioxide to be coated is first slurried in water, preferably in the presence of a dispersing agent. Suitable dispersing agents are a.o. water soluble silicates, for example sodium or potassium metasilicate, aminoalcohols, for example nonoisopropanolamine, 2-amino-2-methyl-1-propanol and 2-dimethylamino-2-methyl-1-propanol, salts of polyacrylic acid such as sodium or ammonium polyacrylates. Preferred dispersing agents are sodium metasilicate and monoisopropanolamine. The amount of the dispersing agent is preferably about 0.1 to 0.4% by weight of the silicon compound calculated as $SiO_2$ and/or preferably about 0.1 to 0.4% by weight of the aminoalcohol.

To a sand-milled TiO$_2$-dispersion an acidic soluble titanium compound such as titanyl sulfate, titanium tetrachloride and titanium oxochloride, is first added in an amount of about 0.1 to 1.5% by weight as TiO$_2$, preferably acidic titanyl sulfate, and thereafter a water soluble phosphate, for example sodium hexametaphosphate (Calgon), alkali metal salts of orto phosphoric acid or phosphoric acid itself, preferably, however, sodium hexametaphosphate. The amount of the phosphate is about 0.1 to 1.0% by weight, calculated as P$_2$O$_5$. Thereby some titanium phosphate is formed onto the pigment particles. Thereafter an acidic, hydrolysable zirconium salt is added, for example a ready made commercial zirconium sulfate solution containing sulfuric acid, zirconium oxide dissolved in concentrated acid such as sulfuric acid, hydrochloric acid or nitric acid or zirconium sulfate tetrahydrate dissolved in water, the amount of the zirconium salt being about 0.1 to 1.4% by weight ZrO$_2$. The acidic slurry is made alkaline with a base, for example sodium hydroxide, so that the pH of the slurry is about 9 to 10. During the said neutralization, in addition to the titanium phosphate coating, also a hydrated zirconium oxide coating is formed (ZrO$_2$.nH$_2$O). The main coating is thereafter prepared by adding to the dispersion an alkaline aluminium compound, for example an alkali metal aluminate, preferably sodium aluminate, the amount of the aluminium compound being about 0.5 to 5.5% by weight of Al$_2$O$_3$. The formed alkaline slurry is neutralized with an acid, for example sulfuric acid, to a pH-range of about 7 to 8. During neutralization, a hydrated oxide coating of aluminium (Al$_2$O$_3$.nH$_2$O) is formed onto the pigment crystals. The percentages by weight given above and below are always calculated from the weight of the TiO$_2$-pigment.

The coating treated titanium dioxide pigment is separated from the slurry by filtering the slurry. The filter cake is washed with a multiple amount of water as compared to the titanium dioxide mass in order to remove the soluble salts formed during the coating as by-products. The washed cake is dried for several hours at an elevated temperature. The dried pigment is finally ground, for example in a jetmill. If specifically desired, an organic agent, for example a polyalcohol, preferably trimethylolethane or -propane, may be added to the washed pigment mass prior to drying or into the dry pigment before or during jetgrinding.

With the described process of manufacture and the amounts of substances used a coated titanium dioxide pigment is obtained having improved weather resistance and/or better gloss in the application tests than the pigments used for comparison. The manufactured pigment is well suited for solvent based paints.

The following examples illustrate the invention without limiting the same. The Examples 1 to 11 are in accordance with the invention and the Comparative examples 1 to 9 concern control pigments made with different amounts of agents and different processes.

EXAMPLE 1

2000 g of titanium dioxide from the calciner discharge from the sulfate process, which had been dry milled in a hammer mill, was slurried in ion-exchanged water to a concentration of 800 g/l TiO$_2$. As a dispersing agent 58 ml of sodium metasilicate (68 g/l SiO$_2$) and 6 g monoisopropanolamine were used. The TiO$_2$-dispersion obtained was ground in a laboratory sand mill using a feed rate of 3 to 4 l/h. The sand-milled dispersion was sifted prior to the coating treatment on a 325 mesh (45 μm) sieve.

The sand-milled and sifted titanium dioxide slurry containing 1200 g of TiO$_2$, was diluted to a concentration of 220 g/l with ion-exchanged water. The obtained slurry was heated to 40° C. while continuously stirring with a laboratory stirrer. Mixing was used also during the coating treatment in order to ensure an even distribution of the treatment chemicals. The coating treatment was initiated by feeding to the slurry, during 5 min, 170 ml of an acidic titanyl solution (70 g/l TiO$_2$). After the addition, the pH of the slurry was below two. To the slurry, in the course of 10 min, 150 ml of water soluble sodium hexametaphosphate, i.e. Calgon (40 g/l P$_2$O$_5$) and 32 ml of an acidic zirconium sulfate solution (252 g/l ZrO$_2$) were next added in the said order. The pH of the slurry was still below two. The acidic slurry was heated to 50° C. and neutralized during 15 min with an alkaline agent to a pH-value of 10. In the course of 15 min, 583 ml of alkaline sodium aluminate (70 g/l Al$_2$O$_3$) was added to the slurry, and after the addition, the pH of the system was 12. Finally neutralization with sulfuric acid was carried out during 15 min to a pH-range of 7 to 8. The slurry was mixed for 30 min at 50° C. after the neutralization.

The coated titanium dioxide pigment was filtered, washed clean of soluble salts with a 16-fold amount of water with respect to the TiO$_2$-amount. To the washed pigment mass 0.6% by weight of trimethylolethane was added. The mass was dried for 16 h at 105° C. in a heating cabinet. The dry pigment was sifted (diameter of the sieve apertures 2 mm) and jet-ground in a laboratory jetmill.

The so treated titanium dioxide pigment contained the following coating elements expressed in oxide form: Ti: 1.0% by weight TiO$_2$, P: 0.5% by weight P$_2$O$_5$, Zr: 0.7% by weight ZrO$_2$ and Al: 3.4% by weight Al$_2$O$_3$.

The following pigments were made in the same manner as in the Example 1, but using the TiO$_2$-, P$_2$O$_5$-, ZrO$_2$- and Al$_2$O$_3$-concentrations indicated in the Table 1.

TABLE 1

| Example | TiO$_2$ % by weight | P$_2$O$_5$ % by weight | ZrO$_2$ % by weight | Al$_2$O$_3$ % by weight |
|---|---|---|---|---|
| 2 | 1.0 | 1.0 | 0.7 | 3.4 |
| 3 | 1.0 | 0.5 | 1.4 | 3.4 |
| 4 | 1.0 | 1.0 | 1.4 | 3.4 |
| 5 | 1.0 | 0.5 | 0.7 | 5.5 |
| 6 | 1.0 | 0.5 | 0.7 | 3.4 |
| | (sample from the burner discharge from the chloride process) | | | |
| 7 | 0.1 | 0.5 | 0.7 | 3.4 |
| 8 | 1.0 | 0.1 | 0.7 | 3.4 |
| 9 | 1.0 | 0.5 | 0.1 | 3.4 |
| 10 | 1.0 | 1.0 | 1.4 | 0.5 |
| 11 | 1.0 | 1.0 | 1.4 | 1.5 |

COMPARATIVE EXAMPLE 1

The pigment was made in the same manner as in the Example 1, but the used P$_2$O$_5$-concentration was 2.0% by weight and the ZrO$_2$-concentration was 2.7% by weight.

COMPARATIVE EXAMPLE 2

The pigment was made in the same manner as in the Example 1, but the titanyl sulfate addition was omitted.

COMPARATIVE EXAMPLE 3

The pigment was made in the same manner as in the Example 1, but the zirconium sulfate addition was omitted.

COMPARATIVE EXAMPLE 4

The pigment was made in the same manner as in the Example 1, but the titanyl sulfate and the sodium hexametaphosphate additions were omitted.

COMPARATIVE EXAMPLE 5

Uncoated $TiO_2$ (2000 g) from the sulfate process was ground in a hammer mill, slurried in water, ground in a sand mill, diluted to treatment concentration and mixed in exactly the same manner as the pigment according to the Example 1. The sand-milled slurry containing 1200 g of uncoated $TiO_2$, was heated to 50° C. The coating treatment was started by feeding to the slurry over a period of 5 min 170 ml of an acidic titanyl sulfate solution (70 g/l $TiO_2$). After completion of the addition, the pH of the slurry was below two. Next 150 ml of water soluble sodium hexametaphosphate, i.e. Calgon (40 g/l $P_2O_5$) and 32 ml of an acidic zirconium sulfate solution (252 g/l $ZrO_2$) were added to the slurry in that order over a period of 10 min. The pH of the slurry was still below two. Further, 556 ml of an acidic aluminium sulfate solution (73 g/l $Al_2O_3$) was added during 15 min. Finally the slurry was neutralized during 15 min with sodium hydroxide to a pH-range of 7 to 8. The slurry was mixed for 30 min at 50° C. after neutralization.

The subsequent treatment steps of the so surface treated pigment (washing, addition of organic agent, drying and jet-milling) were the same as in the Example 1.

COMPARATIVE EXAMPLE 6

Uncoated $TiO_2$ (2000 g) from the sulfate process was ground in a hammer mill, slurried in water, ground in a sand mill, diluted to treatment concentration and mixed in exactly the same manner as the pigment according to the Example 1. The sand-milled slurry containing 1200 g of uncoated $TiO_2$, was heated to 50° C. The coating treatment was started by feeding to the slurry over 5 min 150 ml of a water soluble sodium hexametaphosphate solution, i.e. Calgon (40 g/l $P_2O_5$). Next 583 ml of alkaline sodium aluminate (70 g/l $Al_2O_3$) was added to the slurry over 15 min, and after the addition the pH of the system was 12. In addition, 32 ml of an acidic zirconium sulfate solution (252 g/l $ZrO_2$) was added to the slurry over 5 min. The pH of the slurry was lowered to 11.5. Finally the slurry was neutralized during 15 min with sulfuric acid to a pH-range of 7 to 8. The slurry was mixed for 30 min at 50° C. after neutralization.

The subsequent treatment steps of the so surface treated pigment (washing, addition of organic agent, drying and jet-milling) were the same as for the pigment according to the Example 1. The coating agent levels of the samples were also the same as those in the Example 1, except that as the acidic titanylsulfate addition was omitted, the Comparative example 6 contained no 1% by weight of $TiO_2$ in the coating.

COMPARATIVE EXAMPLE 7

The pigment of the Comparative example 7 was made using uncoated $TiO_2$ from the sulfate process and imitating the process of the Example 2 of the U.S. Pat. No. 4,052,223 so that the pigment contained the following coating substances expressed in oxide form: P: 0.5% by weight $P_2O_5$, Zr: 0.7% by weight $ZrO_2$, Al: 3.4% by weight $Al_2O_3$.

Controls 8 to 9

The pigments of the Examples 1 to 6 were compared in addition to the samples of the Comparative examples 1 to 7, also to commercial pigments, using the following denominations:

Control 8: $TiO_2$ from the sulfate process with a coating of 1.0% by weight of $TiO_2$, 2.2% by weight of $Al_2O_3$ and 1.2% by weight of $SiO_2$.

Control 9: $TiO_2$ from the sulfate process with a coating of 1.5% by weight of $TiO_2$ and 5.5% by weight of $Al_2O_3$.

TESTS AND TEST RESULTS

1. Stoving paint

Pigment gloss was tested in an alkyd-urea-formaldehyde paint (pigment to binder ratio 1 to 1). In the Table 2 are indicated the gloss results from overbaking (180° C.; 45 min; angle of measurement 20°) by comparing the gloss of the pigments to the gloss of the sample of the Example 1 and expressed in percentages thereof (the gloss of the pigment of Example 1 thus corresponding to 100%).

1. Printing ink

A gloss test more sensitive than the stoving paint is the nitrocellulose printing ink (pigment to binder ratio 1.7 to 1). The results of the Table 2 have been indicated using the same principles as for the stoving paint, i.e. the printing ink gloss of the pigment of the Example 1 corresponds to 100%. The original gloss values have been measured at an angle of 20°.

3. Weather test

Weather resistance was measured for a long oil alkyd resin (pigment to binder ratio 0.8 to 1). Paint panels were exposed to UV-light and moisture in a QUV weathering tester. The paint panels were successively exposed to the following stages:

1. 4 h of UV-light, temperature 60° C.
2. 4 h water condensation stage, temperature 45°

The 20° and 60° gloss were measured in between. The measured gloss after the various test periods are indicated in the Table 2. Part of the pigments were also tested under natural weather conditions. The binder used was the same as in the accelerated weather test. The results are indicated in the Table 3.

TABLE 2

Test results for the Examples 1 to 11, for the Comparative examples 1 to 7 and the Controls 8 to 9.

| Sample | Stoving paint gloss* % | Printing ink gloss* % | Accelerated Weathering Test, QUV-apparatus 60° gloss | | | | | |
|---|---|---|---|---|---|---|---|---|
| | | | 0 | 200 | 400 | 600 | 900 | h |
| Example 1 | 100 | 100 | 100 | 100 | 100 | 100 | 100 | |
| Example 2 | 96 | 94 | 102 | 96 | 93 | 94 | 93 | |
| Example 3 | 93 | 85 | 101 | 105 | 106 | 104 | 107 | |
| Example 4 | 103 | 88 | 101 | 103 | 104 | 104 | 107 | |
| Example 5 | 91 | 76 | 99 | 98 | 102 | 102 | 83 | |
| Example 6 | 100 | 100 | 100 | 102 | 98 | 100 | 100 | |
| Example 7 | 102 | | 99 | 87 | 95 | 96 | | |
| Example 8 | 100 | | 99 | 101 | 105 | 104 | | |
| Example 9 | 100 | | 100 | 89 | 93 | 96 | | |
| Example 10 | 100 | | 105 | 97 | 103 | 94 | | |
| Example 11 | 98 | | 106 | 94 | 98 | 94 | | |
| Comp. Ex. 1 | 84 | 36 | 103 | 99 | 98 | 94 | 95 | |
| Comp. | 94 | 100 | 100 | 86 | 91 | 82 | 81 | |

TABLE 2-continued

Test results for the Examples 1 to 11, for the Comparative examples 1 to 7 and the Controls 8 to 9.

| Sample | Stoving paint gloss* % | Printing ink gloss* % | Accelerated Weathering Test, QUV-apparatus 60° gloss | | | | |
|---|---|---|---|---|---|---|---|
| | | | 0 | 200 | 400 | 600 | 900 h |
| Ex. 2 | | | | | | | |
| Comp. Ex. 3 | 95 | 90 | 101 | 82 | 95 | 88 | 40 |
| Comp. Ex. 4 | 100 | 110 | 101 | 90 | 98 | 84 | 77 |
| Comp. Ex. 5 | 89 | 81 | 102 | 87 | 93 | 92 | 91 |
| Comp. Ex. 6 | 97 | 88 | 101 | 75 | 79 | 70 | 67 |
| Comp. Ex. 7 | 74 | 31 | 108 | 76 | 68 | 58 | 51 |
| Cont. 8 | 63 | 13 | 102 | 76 | 79 | 68 | 60 |
| Cont. 9 | 95 | 60 | 99 | 93 | 93 | 78 | 70 |

*The gloss of the pigment samples are compared to the gloss of the pigment of the Example 1 and are indicated as % of the gloss value of the pigment of Example 1.

TABLE 3

Results of the natural weather tests for Example 1, Comparative Examples 2 to 7 and Controls 8 to 9

| Sample | Natural weather test, 20°/60° gloss measurements* | | |
|---|---|---|---|
| | 1 | 5 | 13 months |
| Example 1 | 100/100 | 100/100 | 100/100 |
| Comp. Ex. 2 | 101/101 | 82/93 | 7/36 |
| Comp. Ex. 3 | 100/100 | 93/96 | 61/81 |
| Comp. Ex. 4 | 100/101 | 89/96 | 46/74 |
| Comp. Ex. 5 | 101/100 | 94/95 | 66/80 |
| Comp. Ex. 6 | 100/101 | 57/79 | 5/20 |
| Comp. Ex. 7 | 96/99 | 70/86 | 39/61 |
| Control 8 | 97/99 | 87/93 | 86/88 |
| Control 9 | 96/100 | 72/91 | 28/63 |

*The gloss of the pigment samples are compared to the gloss of the pigment of the Example 1 and are indicated as % of the gloss value for the pigment of the Example 1.

Table 2 indicates that by using the coating treatment and the coating amounts of the Example 1 (1.0% by weight of $TiO_2$, 0.5% by weight of $P_2O_5$, 0.7% by weight of $ZrO_2$ and 3.4% by weight of $Al_2O_3$) a pigment exhibiting very good optical characteristics (gloss) is obtained, which pigment also has improved weather resistance. Using the same process, but larger amounts of coating substances (Examples 2 to 5), the optical characteristics (gloss) suffer somewhat. The coating treatment of the Example 1 is also well suited for uncoated $TiO_2$ from the chloride process (Example 6). Examples 7 to 11 show that also small additions of $TiO_2$, $P_2O_5$ and $ZrO_2$ improve weather resistance. When the phosphate and zirconium oxide coating levels are raised above the amounts used according to the invention, the gloss suffers (Comparative example 1). By omitting from the coating treatment of the Example 1 the titanyl sulfate addition (Comparative example 2) or the zirconium sulfate addition (Comparative example 3) or the titanyl sulfate and the sodium hexametaphosphate additions (Comparative example 4), weather resistance suffers.

Using different coating techniques (Comparative examples 5, 6 and 7) makes the gloss properties as well as the important weather resistance suffer.

Very good results have been obtained for the product according to the Example 1 in the natural weather test as compared to the Comparative examples.

When comparing the pigment according to the Example 1 to the commercial pigments (Controls 8 to 9) it is evident that a clear advantage has been obtained with the present coating process in the application tests used.

I claim:

1. Process for coating a titanium dioxide ($TiO_2$) pigment with hydrated oxides of phosphorous, zirconium and aluminum, the process comprising the steps of: providing a dispersion of titanium dioxide in water, to the titanium dioxide pigment dispersion (1) an acidic hydrolysable titanium compound in an amount of 0.1 to 1.5% by weight calculated as $TiO_2$, (2) a water soluble phosphate in an amount of 0.1 to 1.0% by weight calculated as $P_2O_5$, (3) an acidic hydrolysable zirconium salt in an amount of 0.1 to 1.4% by weight calculated as $ZrO_2$, is added, the slurry is make alkaline with a base, and (4) a water soluble hydrolysable alkaline aluminum compound is added in an amount of 0.5 to 5.5% by weight calculated as $Al_2O_3$, wherein all percentages by weight are based on the weight of the $TiO_2$-pigment, and the alkaline slurry formed is neutralized with an acid and the coated titanium dioxide pigment is recovered.

2. Process according to claim 1, wherein the titanium dioxide pigment is produced by a sulfate or the chloride process.

3. Process according to claim 1, wherein the dispersion includes a dispersing agent.

4. Process according to claim 3, wherein the dispersing agent is selected from the group consisting of a water soluble silicate, sodium metasilicate, aminoalcohol, and monoisopropanolamine.

5. Process according to claim 1, wherein the acidic hydrolysable titanium compound is titanyl sulfate (TiOSO_4).

6. Process according to claim 5, wherein the amount of the titanium compound is about 1% by weight calculated as $TiO_2$.

7. Process according to claim 1, wherein the water soluble phosphate is selected from the group consisting of sodium hexametaphosphate, phosphoric acid, and disodium hydrogenphosphate.

8. Process according to claim 7, wherein the amount of phosphate is about 0.4 to 0.6% by weight calculated as $P_2O_5$.

9. Process according to claim 1, wherein the acidic hydolysable zirconium salt is selected form the group consisting of a zirconium sulfate solution containing sulfuric acid, zirconium dioxide dissolved in concentrated hydrochloric acid, and zirconium sulfate tetrahydrate dissolved in water.

10. Process according to claim 9, wherein the amount of the zirconium salt is about 0.5 to 0.7% by weight calculated as $ZrO_2$.

11. Process according to claim 1, wherein the alkaline aluminum compound is sodium aluminate.

12. Process according to claim 11, wherein the amount of the aluminum compound is about 3.0 to 3.4% by weight calculated as $Al_2O_3$.

13. Process according to claim 1, wherein pH is adjusted to a value of about 9 to 10 prior to the addition of the aluminum compound.

14. Coated titanium dioxide pigment produced by a process according to any one of claims 1 to 13.

* * * * *

UNITED STATES PATENT AND TRADEMARK OFFICE
CERTIFICATE OF CORRECTION

PATENT NO. : 5,165,995

DATED : November 24, 1992

INVENTOR(S) : Losoi

It is certified that error appears in the above-identified patent and that said Letters Patent is hereby corrected as shown below:

Column 4, line 11, after "titanyl" insert --sulfate--.

Signed and Sealed this

Fifth Day of October, 1993

Attest:

BRUCE LEHMAN

*Attesting Officer*  Commissioner of Patents and Trademarks